(12) United States Patent
Kataoka et al.

(10) Patent No.: US 10,179,500 B2
(45) Date of Patent: Jan. 15, 2019

(54) EJECTOR-TYPE REFRIGERATION CYCLE

(71) Applicant: DENSO CORPORATION, Kariya, Aichi-pref. (JP)

(72) Inventors: Hiroshi Kataoka, Kariya (JP); Shun Kurata, Kariya (JP); Isamu Takasugi, Kariya (JP); Haruyuki Nishijima, Kariya (JP); Youhei Nagano, Kariya (JP); Yoshiyuki Yokoyama, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/502,606

(22) PCT Filed: Aug. 7, 2015

(86) PCT No.: PCT/JP2015/003981
§ 371 (c)(1),
(2) Date: Feb. 8, 2017

(87) PCT Pub. No.: WO2016/031156
PCT Pub. Date: Mar. 3, 2016

(65) Prior Publication Data
US 2017/0232821 A1    Aug. 17, 2017

(30) Foreign Application Priority Data

Aug. 28, 2014 (JP) .................. 2014-173726
Jul. 8, 2015 (JP) .................. 2015-136734

(51) Int. Cl.
*F25B 1/06* (2006.01)
*B60H 1/32* (2006.01)
(Continued)

(52) U.S. Cl.
CPC ........... *B60H 1/3204* (2013.01); *F04B 41/06* (2013.01); *F04F 5/46* (2013.01); *F25B 6/04* (2013.01);
(Continued)

(58) Field of Classification Search
CPC .... B60H 1/3204; B60H 1/323; B60H 1/3229; B60H 2001/3297; B60H 2001/3298;
(Continued)

(56) References Cited

U.S. PATENT DOCUMENTS

2001/0025499 A1\* 10/2001 Takeuchi ................ F25B 9/008
62/175
2011/0174015 A1    7/2011 Nagano et al.
2015/0033790 A1    2/2015 Yamada et al.

FOREIGN PATENT DOCUMENTS

JP        H06137695 A    5/1994
JP        2010036737 A   2/2010
(Continued)

OTHER PUBLICATIONS

U.S. Appl. No. 15/502,579, filed Feb. 8, 2017, Kurata et al.
U.S. Appl. No. 15/502,631, filed Feb. 8, 2017, Takasugi et al.

*Primary Examiner* — Joseph Trpisovsky
(74) *Attorney, Agent, or Firm* — Harness, Dickey & Pierce, P.L.C.

(57) ABSTRACT

An ejector-type refrigeration cycle includes an ejector module integrated with a gas-liquid separation device. A length of an inlet pipe that connects a liquid-phase refrigerant outflow port of an ejector module to a refrigerant inflow port of an evaporator is shorter than a length of a suction pipe that connects a gas-phase refrigerant outflow port of the ejector module to a suction port of the compressor.

15 Claims, 4 Drawing Sheets

(51) Int. Cl.
*F04B 41/06* (2006.01)
*F04F 5/46* (2006.01)
*F25B 6/04* (2006.01)
*F25B 41/00* (2006.01)

(52) U.S. Cl.
CPC ...... *F25B 41/00* (2013.01); *B60H 2001/3291* (2013.01); *B60H 2001/3297* (2013.01); *B60H 2001/3298* (2013.01); *F25B 2341/0012* (2013.01)

(58) Field of Classification Search
CPC ..... B60H 2001/3291; F25B 2341/0015; F25B 9/08; F25B 2341/0012; F25B 2341/0011; F25B 2341/0014; F25B 6/04; F25B 41/00
USPC .................................................. 62/498, 500
See application file for complete search history.

(56) References Cited

FOREIGN PATENT DOCUMENTS

| | | |
|---|---|---|
| JP | 2011145035 A | 7/2011 |
| JP | 2013177879 A | 9/2013 |

\* cited by examiner

EJECTOR-TYPE REFRIGERATION CYCLE

CROSS REFERENCE TO RELATED APPLICATIONS

This application is a U.S. National Phase Application under 35 U.S.C. 371 of International Application No. PCT/JP2015/003981 filed on Aug. 7, 2015 and published in Japanese as WO 2016/031156 A1 on Mar. 3, 2016. This application is based on and claims the benefit of priority from Japanese Patent Applications No. 2014-173726 filed on Aug. 28, 2014, and No. 2015-136734 filed on Jul. 8, 2015. The entire disclosures of all of the above applications are incorporated herein by reference.

TECHNICAL FIELD

The present disclosure relates to an ejector-type refrigeration cycle having an ejector as a refrigerant depressurizing device.

BACKGROUND ART

Up to now, an ejector-type refrigeration cycle that is a vapor compression refrigeration cycle device having an ejector as a refrigerant depressurizing device has been known.

In the ejector-type refrigeration cycle of this type, a refrigerant that has flowed out of an evaporator is drawn into a refrigerant suction port of the ejector by a suction action of an ejection refrigerant ejected at high speed from a nozzle portion of the ejector. A mixture refrigerant of the ejection refrigerant and the drawn refrigerant is increased in pressure by a diffuser portion (pressure increase portion) of the ejector, and then drawn into a compressor.

With the above configuration, in the ejector-type refrigeration cycle, a pressure of the drawn refrigerant can be increased more than the pressure of the drawn refrigerant in a normal refrigeration cycle device in which a refrigerant evaporation pressure in an evaporator is substantially equal to a pressure of the drawn refrigerant to be drawn into the compressor. Therefore, in the ejector-type refrigeration cycle, a coefficient of performance (COP) of the cycle can be improved with a reduction of a power consumption of the compressor.

Further, Patent Document 1 discloses an ejector (hereinafter referred to as "ejector module") integrated with a gas-liquid separation device (gas-liquid separation portion).

According to the ejector module of Patent Document 1, a suction side of the compressor is connected to a gas-phase refrigerant outflow port, out of which a gas-phase refrigerant separated by the gas-liquid separation device flows. A refrigerant inflow port side of the evaporator is connected to a liquid-phase refrigerant outflow port, out of which a liquid-phase refrigerant separated by the gas-liquid separation device flows. Further, a refrigerant outflow port side of the evaporator is connected to the refrigerant suction port, thereby being capable of extremely easily configuring the ejector-type refrigeration cycle.

However, in the ejector module of Patent Document 1, since the gas-liquid separation device has an integrated configuration, the liquid-phase refrigerant separated by the gas-liquid separation device is likely to absorb a heat from the external when the ejector module per se or an inlet pipe connecting a liquid-phase refrigerant outflow port of the ejector module and a refrigerant inflow port of the evaporator is placed under a high-temperature environment.

Then, when the liquid-phase refrigerant separated by the gas-liquid separation device absorbs heat from the external, and an enthalpy of the refrigerant flowing into the evaporator rises, a refrigeration performance delivered in the evaporator may decrease. Incidentally, the refrigeration performance delivered in the evaporator is defined by an enthalpy difference obtained by subtracting an enthalpy of the refrigerant on an evaporator inlet side from an enthalpy of the refrigerant on an evaporator outlet side.

Further, in the ejector-type refrigeration cycle, a temperature of the refrigerant flowing into the evaporator becomes lower than that in a general refrigeration cycle device. For that reason, as compared to the general refrigeration cycle device, a temperature difference between the refrigerant flowing into the evaporator and the external is likely to be large, and the enthalpy of the refrigerant flowing into the evaporator is likely to increase.

PRIOR ART DOCUMENT

Patent Document

Patent Document 1: JP 2013-177879 A

SUMMARY

The present disclosure has been made in view of the above points, and an object of the present disclosure is to provide an ejector-type refrigeration cycle which is capable of suppressing a reduction in refrigeration performance delivered in an evaporator.

According to a first aspect of the present disclosure, an ejector-type refrigeration cycle includes a compressor, a radiator, an ejector module having a body portion, an evaporator, an inlet pipe, and a suction pipe. The compressor compresses and discharges a refrigerant, and the radiator radiates heat of the refrigerant discharged from the compressor. The body portion includes: a nozzle portion which reduces a pressure of the refrigerant which has flowed out of the radiator; a refrigerant suction port which draws a refrigerant by a suction action of an ejection refrigerant ejected at high speed from the nozzle portion; a pressure increase portion which mixes the ejection refrigerant with a drawn refrigerant drawn from the refrigerant suction port and increases a pressure of the mixed refrigerant; a gas-liquid separation portion which separates the refrigerant that has flowed out of the pressure increase portion into gas and liquid; a liquid-phase refrigerant outflow port through which a liquid-phase refrigerant separated by the gas-liquid separation portion flows out; and a gas-phase refrigerant outflow port through which a gas-phase refrigerant separated by the gas-liquid separation portion flows out. The evaporator evaporates the liquid-phase refrigerant separated by the gas-liquid separation portion. The inlet pipe connects the liquid-phase refrigerant outflow port to a refrigerant inflow port of the evaporator. The suction pipe connects the gas-phase refrigerant outflow port to a suction port of the compressor. A length of the inlet pipe is shorter than a length of the suction pipe.

According to the above configuration, since the length of the inlet pipe is shorter than the length of the suction pipe, the liquid-phase refrigerant separated by the gas-liquid separation portion can be restrained from absorbing the heat from the external when flowing into the inlet pipe. Therefore, a reduction in the refrigeration performance delivered in the evaporator can be suppressed.

In this example, the "length of the pipe" can be directed to a total length of a center line of the pipe shaped into a straight line or a curved line. Therefore, the "length of the pipe" can be expressed as a "flow channel length". In addition, the "pipe" is not limited to a tubular member, but includes a member providing a flow channel in which the refrigerant flows, which is formed in shapes other than the tubular shape.

According to a second aspect of the present disclosure, an ejector-type refrigeration cycle includes a compressor, a radiator, an ejector module having a body portion, and an evaporator. The compressor compresses and discharges a refrigerant, and the radiator radiates heat of the refrigerant discharged from the compressor. The body portion includes: a nozzle portion which reduces a pressure of the refrigerant which has flowed out of the radiator; a refrigerant suction port which draws the refrigerant by a suction action of an ejection refrigerant ejected at high speed from the nozzle portion; a pressure increase portion which mixes the ejection refrigerant with a drawn refrigerant drawn from the refrigerant suction port and increases a pressure of the mixed refrigerant; a gas-liquid separation portion which separates the refrigerant that has flowed out of the pressure increase portion into gas and liquid; a liquid-phase refrigerant outflow port through which a liquid-phase refrigerant separated by the gas-liquid separation portion flows out; and a gas-phase refrigerant outflow port through which a gas-phase refrigerant separated by the gas-liquid separation portion flows out. The evaporator evaporates the liquid-phase refrigerant separated by the gas-liquid separation portion. The ejector module is disposed closer to the evaporator than to the compressor.

According to the above configuration, since the ejector module is disposed closer to the evaporator than the compressor, the length of the inlet pipe that connects the liquid-phase refrigerant outflow port with the evaporator can be easily set to be shorter than the length of the suction pipe that connects the gas-phase refrigerant outflow port to the compressor. Therefore, as in the first aspect, a reduction in the refrigeration performance delivered in the evaporator can be suppressed.

DESCRIPTION OF EMBODIMENTS

Hereinafter, multiple embodiments for implementing the present invention will be described referring to drawings. In the respective embodiments, a part that corresponds to a matter described in a preceding embodiment may be assigned the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

(First Embodiment)

Figure 1:
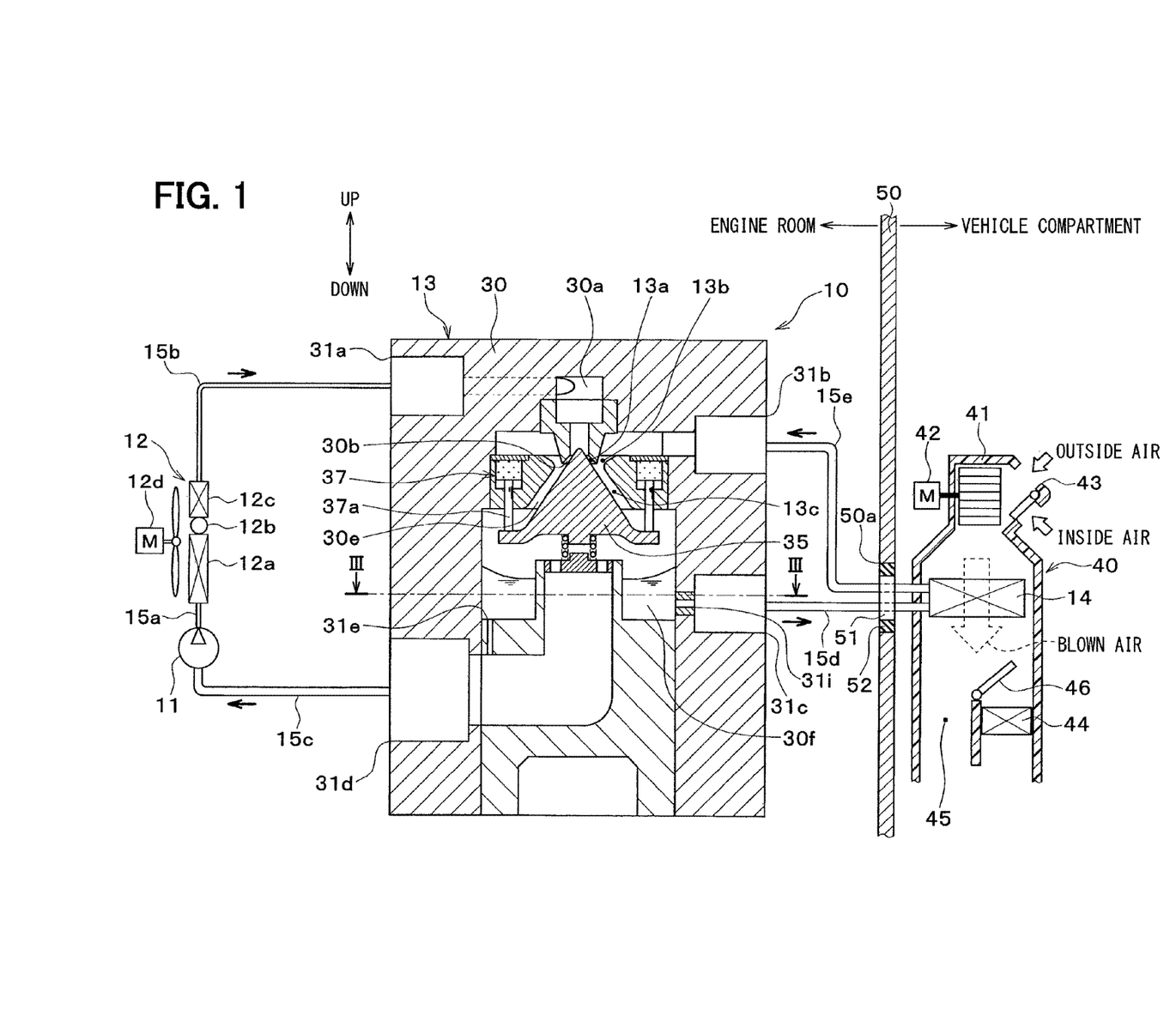
FIG. 1 is a schematic diagram of an ejector-type refrigeration cycle according to a first embodiment of the present disclosure.

A first embodiment of the present disclosure will be described below with reference to the drawings. An ejector-type refrigeration cycle 10 according to the present embodiment, which is illustrated in an overall configuration diagram of FIG. 1, is applied to a vehicle air conditioning apparatus, and performs a function of cooling a blown air to be blown into a vehicle compartment (vehicle interior space) that is an air-conditioning target space. Therefore, the cooling target fluid in the ejector-type refrigeration cycle 10 is the blown air.

The ejector-type refrigeration cycle 10 employs an HFC based refrigerant (specifically, R134a) as the refrigerant, and forms a subcritical refrigeration cycle in which a high-pressure side refrigerant pressure does not exceed a critical pressure of the refrigerant. The refrigeration cycle 10 may employ an HFO based refrigerant (specifically, R1234yf) or the like as the refrigerant. Furthermore, refrigerator oil for lubricating a compressor 11 is mixed in the refrigerant, and a part of the refrigerator oil circulates in the cycle together with the refrigerant.

The compressor 11 that is one configuration equipment of the ejector-type refrigeration cycle 10 draws the refrigerant, pressurizes the refrigerant to a high-pressure refrigerant, and discharges the refrigerant. The compressor 11 is disposed in an engine room together with an internal combustion engine (engine) not shown which outputs a vehicle traveling driving force. The compressor 11 is driven by a rotational driving force output from the engine through a pulley, a belt, and the like.

In more detail, in the present embodiment, the compressor 11 employs a variable capacity type compressor that is configured so that a refrigerant discharge capacity can be adjusted by changing a discharge volume. The discharge capacity (refrigerant discharge capacity) of the compressor 11 is controlled according to a control current to be output to a discharge capacity control valve of the compressor 11 from a control device to be described later.

Also, the engine room in the present embodiment is a vehicle exterior space in which the engine is housed, which is surrounded by a vehicle body, a fire wall 50 to be described later, and so on. The engine room may be also called "engine compartment". A discharge port of the compressor 11 is connected with a refrigerant inflow port of a condensing portion 12a of a radiator 12 through an upstream side high-pressure pipe 15a.

The radiator 12 is a radiation heat exchanger that performs a heat exchange between the high-pressure refrigerant discharged from the compressor 11 and a vehicle exterior air (outside air) blown by a cooling fan 12d to radiate the heat from the high-pressure refrigerant and cool the high-pressure refrigerant. The radiator 12 is disposed on a front side of the vehicle in the engine room.

More specifically, the radiator 12 according to the present embodiment is configured as a so-called subcooling condenser including the condensing portion 12a, a receiver portion 12b, and a subcooling portion 12c. The condensing portion 12a performs the heat exchange between a high-pressure gas-phase refrigerant discharged from the compressor 11 and an outside air blown from the cooling fan 12d, and radiates the heat from the high pressure gas-phase refrigerant to condense the high pressure gas-phase refrigerant. The receiver portion 12b separates gas and liquid of the refrigerant that has flowed out of the condensing portion 12a and stores an excess liquid-phase refrigerant. The subcooling portion 12c performs the heat exchange between the liquid-phase refrigerant that has flowed out of the receiver portion 12b and the outside air blown from the cooling fan 12d and subcools the liquid-phase refrigerant.

The cooling fan 12d is an electric blower, a rotating speed (blown air amount) of which is controlled by a control voltage output from the control device. A refrigerant inflow port 31a of an ejector module 13 is connected to a refrigerant outflow port of the subcooling portion 12c of the radiator 12 through a downstream side high-pressure pipe 15b.

The ejector module 13 functions as a refrigerant depressurizing device for reducing a pressure of the high pressure liquid-phase refrigerant of the subcooling state, which has flowed out of the radiator 12, and allowing the refrigerant to flow to the downstream side. The ejector module 13 also functions as a refrigerant circulating device (refrigerant transport device) for suctioning (transporting) the refrigerant that has flowed out of an evaporator 14 to be described later by the suction action of a refrigerant flow ejected at high speed to circulate the refrigerant. Further, the ejector module 13 according to the present embodiment functions as a gas-liquid separation device for separating the pressure-reduced refrigerant into gas and liquid.

In other words, the ejector module 13 according to the present embodiment is configured as an "ejector integrated with a gas-liquid separation device" or an "ejector with a gas-liquid separation function". In the present embodiment, in order to clarify a difference from an ejector having no gas-liquid separation device (gas-liquid separation portion), a configuration in which the ejector is integrated (modularized) with the gas-liquid separation device is expressed by a term of "ejector module".

The ejector module 13 is disposed in the engine room together with the compressor 11 and the radiator 12. Incidentally, respective up and down arrows in FIG. 1 indicate up and down directions in a state where the ejector module 13 is mounted in the vehicle, and the respective up and down directions in a state where other components are mounted in the vehicle are not limited to the above arrows.

In more detail, as illustrated in FIG. 1, the ejector module 13 according to the present embodiment includes a body portion 30 configured by the combination of multiple components. The body portion 30 is made of a cylindrical metal member. The body portion 30 is provided with multiple refrigerant inflow ports and multiple internal spaces.

The multiple refrigerant inflow and outflow ports provided in the body portion 30 include a refrigerant inflow port 31a, a refrigerant suction port 31b, a liquid-phase refrigerant outflow port 31c, a gas-phase refrigerant outflow port 31d, and so on. The refrigerant inflow port 31a allows the refrigerant that has flowed out of the radiator 12 to flow into the body portion 30. The refrigerant suction port 31b draws the refrigerant that has flowed out of the evaporator 14. The liquid-phase refrigerant outflow port 31c allows the liquid-phase refrigerant separated by a gas-liquid separation space 30f provided in the body portion 30 to flow to the refrigerant inlet side of the evaporator 14. The gas-phase refrigerant outflow port 31d allows the gas-phase refrigerant separated by the gas-liquid separation space 30f to flow to the suction side of the compressor 11.

The internal space provided in the body portion 30 includes a swirling space 30a, a depressurizing space 30b, a pressurizing space 30e, the gas-liquid separation space 30f, and so on. The swirling space 30a swirls the refrigerant that has flowed from the refrigerant inflow port 31a. The depressurizing space 30b reduces the pressure of the refrigerant that has flowed out of the swirling space 30a. The pressurizing space 30e allows the refrigerant that has flowed out of the depressurizing space 30b to flow into the pressurizing space 30e. The gas-liquid separation space 30f separates the refrigerant that has flowed out of the pressurizing space 30e into gas and liquid.

The swirling space 30a and the gas-liquid separation space 30f are each shaped into a substantially cylindrical rotating body. The depressurizing space 30b and the pressurizing space 30e are each shaped into a substantially truncated cone-shaped rotating body that gradually expands toward the gas-liquid separation space 30f side from the swirling space 30a side. All of the center axes of those spaces are disposed coaxially. Incidentally, the rotating body represents a three-dimensional shape provided when rotating a plane figure around one straight line (center axis) on the same plane.

Further, the body portion 30 is provided with a suction passage 13b, and the suction passage 13b introduces the refrigerant drawn from the refrigerant suction port 31b to a downstream side of the depressurizing space 30b in the refrigerant flow and an upstream side of the pressurizing space 30e in the refrigerant flow.

A passage formation member 35 is disposed in the depressurizing space 30b and the pressurizing space 30e. The passage formation member 35 is formed in an approximately cone shape which gradually expands more toward an outer peripheral side with distance from the depressurizing space 30b, and a center axis of the passage formation member 35 is also disposed coaxially with the center axis of the depressurizing space 30b and so on.

A refrigerant passage is provided between an inner peripheral surface of a portion providing the depressurizing space 30b and the pressurizing space 30e of the body portion 30 and a conical side surface of the passage formation member 35. A shape of an axial vertical cross-section of the refrigerant passage is toric (a donut shape in which a small-diameter circular shape coaxially disposed is removed from a circular shape).

In the above refrigerant passage, a refrigerant passage provided between a portion providing the depressurizing space 30b of the body portion 30 and a portion of the conical side surface of the passage formation member 35 on an apex side is shaped to narrow a passage cross-sectional area toward a refrigerant flow downstream side. With that shape, the refrigerant passage configures a nozzle passage 13a that functions as a nozzle portion which reduces the pressure of the refrigerant in an isentropic manner and ejects the refrigerant.

In more detail, the nozzle passage 13a according to the present embodiment is shaped to gradually reduce a passage cross-sectional area toward a minimum passage area portion from an inlet side of the nozzle passage 13a, and gradually expand the passage cross-sectional area from the minimum passage area portion toward an outlet side of the nozzle passage 13a. In other words, in the nozzle passage 13a according to the present embodiment, the refrigerant passage cross-sectional area is changed as in a so-called "Laval nozzle".

A refrigerant passage provided between a portion forming the pressurizing space 30e of the body portion 30 and a downstream portion of the conical side surface of the passage formation member 35 is shaped to gradually expand the passage cross-sectional area toward the refrigerant flow downstream side. With that configuration, the refrigerant passage configures a diffuser passage 13c functioning as a diffuser portion (pressure increase portion) which mixes an ejection refrigerant ejected from the nozzle passage 13a with a drawn refrigerant drawn from refrigerant suction port 31b to increase the pressure.

An element 37 functioning as a drive device for displacing the passage formation member 35 to change the passage cross-sectional area of the minimum passage area portion of the nozzle passage 13a is disposed in the body portion 30. In more detail, the element 37 has a diaphragm that is displaced according to a temperature and a pressure of the refrigerant (that is, refrigerant flowing out of the evaporator 14) which flows in the suction passage 13b. The displacement of the diaphragm is transferred to the passage formation member 35 through an actuating bar 37a, to thereby displace the passage formation member 35 in a vertical direction.

Further, with increase in the temperature (the degree of superheat) of the refrigerant flowing out of the evaporator 14, the element 37 displaces the passage formation member 35 in a direction of expanding the passage cross-sectional area of the minimum passage area portion (toward the lower side in the vertical direction). On the other hand, with a decrease in the temperature (the degree of superheat) of the refrigerant flowing out of the evaporator 14, the element 37 displaces the passage formation member 35 in a direction reducing the passage cross-sectional area of the minimum passage area portion (toward the upper side in the vertical direction).

In the present embodiment, the element 37 displaces the passage formation member 35 according to the degree of superheating of the refrigerant flowing out of the evaporator 14 as described above. As a result, the passage cross-sectional area of the minimum passage area portion of the nozzle passage 13a is adjusted so that the degree of superheating of the refrigerant present on the outlet side of the evaporator 14 comes closer to a predetermined reference superheat degree.

The gas-liquid separation space 30f is disposed on a lower side of the passage formation member 35. The gas-liquid separation space 30f configures a gas-liquid separation portion of a centrifugation type which swirls the refrigerant that has flowed out of the diffuser passage 13c around a center axis and separates gas and liquid of the refrigerant by the action of a centrifugal force. Further, the gas-liquid separation space 30f has an internal capacity insufficient to substantially accumulate an excessive refrigerant even if a load is varied in the cycle, and the refrigerant circulation flow rate that is circulated in the cycle is varied.

In addition, an oil return hole 31e is provided in a portion defining a bottom surface of the gas-liquid separation space 30f in the body portion 30. The oil return hole 31e returns the refrigerator oil in the separated liquid-phase refrigerant to a gas-phase refrigerant passage side that connects the gas-liquid separation space 30f to the gas-phase refrigerant outflow port 31d. In addition, an orifice 31i is disposed in the liquid-phase refrigerant passage that connects the gas-liquid separation space 30f to the liquid-phase refrigerant outflow port 31c. The orifice 31i functions as a depressurizing device for reducing the pressure of the refrigerant that is allowed to flow into the evaporator 14.

The gas-phase refrigerant outflow port 31d of the ejector module 13 is connected with a suction port of the compressor 11 through a suction pipe 15c. On the other hand, the liquid-phase refrigerant outflow port 31c is connected with a refrigerant inflow port of the evaporator 14 through the inlet pipe 15d.

The evaporator 14 is a heat-absorbing heat exchanger that performs a heat exchange between the low-pressure refrigerant depressurized by the ejector module 13 and the blown air that is blown into the vehicle compartment from a blower 42, to thereby evaporate the low-pressure refrigerant and exert a heat absorbing effect. Further, the evaporator 14 is disposed in a casing 41 of a vehicle interior air conditioning unit 40 to be described later.

In this example, the vehicle of the present embodiment is equipped with a fire wall 50 as a partition plate that partitions the vehicle into the vehicle interior and the engine room outside the vehicle compartment. The fire wall 50 has a function of reducing a heat, noise, and so on to be transferred from the engine room to the vehicle compartment, and may be called "dash panel".

As illustrated in FIG. 1, the vehicle interior air conditioning unit 40 is disposed on the vehicle compartment side with respect to the fire wall 50. Therefore, the evaporator 14 is disposed in the vehicle compartment (vehicle interior space). The refrigerant outflow port of the evaporator 14 is connected with the refrigerant suction port 31b of the ejector module 13 through an outlet pipe 15e.

In this example, since the ejector module 13 is disposed in the engine room (vehicle exterior space) as described above, the inlet pipe 15d and the outlet pipe 15e are disposed to penetrate through the fire wall 50.

In more detail, the fire wall 50 is provided with a circular or rectangular through hole 50a that penetrates between the engine room side and the vehicle compartment (vehicle interior space) side. The inlet pipe 15d and the outlet pipe 15e are connected to a connector 51 which is a connection metal member and integrated together. The inlet pipe 15d and the outlet pipe 15e are disposed to penetrate through the through hole 50a in a state where the inlet pipe 15d and the outlet pipe 15e are integrated together by the connector 51.

In this situation, the connector 51 is located on an inner peripheral side or in the vicinity of the through hole 50a. A packing 52 made of an elastic member is disposed in a gap provided between an outer peripheral side of the connector 51 and an opening edge of the through hole 50a. In the present embodiment, the packing 52 is made of ethylene propylene diene copolymer rubber (EPDM) that is a rubber material excellent in heat resistance.

With the interposition of the packing 52 in the gap provided between the connector 51 and the through hole 50a, water, noise, and so on are restrained from being leaked into the vehicle compartment from the engine room through the gap provided between the connector 51 and the through hole 50a.

Further, in the ejector-type refrigeration cycle 10 of the present embodiment, respective pipe diameters (passage cross-sectional area) of a suction pipe 15c, the inlet pipe 15d, and the outlet pipe 15e in which a low-pressure refrigerant flows are larger than pipe diameters (passage cross-sectional area) of the upstream side high-pressure pipe 15a and the downstream side high-pressure pipe 15b in which a high-pressure refrigerant flows. In addition, the suction pipe 15c, the inlet pipe 15d, and the outlet pipe 15e are equal in the pipe diameter (passage cross-sectional area) to each other.

Also, the ejector module 13 according to the present embodiment is disposed closer to the evaporator 14 than the compressor 11. In other words, the shortest distance between the evaporator 14 and the ejector module 13 is shorter than the shortest distance between the compressor 11 and the ejector module 13. A length of the inlet pipe 15d is shorter than a length of the suction pipe 15c. Further, the length of the inlet pipe 15d according to the present embodiment is equal to or shorter than 2 m (meter) as with a length of the inlet pipe for the normal refrigeration cycle device used in a general vehicle air conditioning apparatus.

In this example, the length of the pipe in the present embodiment is a total length of a center line of the pipe shaped into a straight line or a curved line. Therefore, the length of the pipe can be expressed as a flow channel length. In addition, the pipe in the present embodiment is not limited to a tubular member, but includes a member providing a flow channel in which the refrigerant flows, which is formed in shapes other than the tubular shape as with the connector 51.

Incidentally, the length of the inlet pipe 15d according to the present embodiment is set to the length of the pipe extending from the liquid-phase refrigerant outflow port 31c of the ejector module 13 to the refrigerant inflow port of the evaporator 14.

Subsequently, the vehicle interior air conditioning unit 40 will be described. The vehicle interior air conditioning unit 40 is used to blow the blown air, the temperature of which has been adjusted by the ejector-type refrigeration cycle 10, into the vehicle compartment. The vehicle interior air conditioning unit 40 is disposed inside a dashboard (instrument panel) positioned at the foremost portion in the vehicle compartment. Moreover, the vehicle interior air conditioning unit 40 is configured so that the blower 42, the evaporator 14, a heater core 44, an air mixture door 46, and so on are housed in the casing 41 forming an outer shell of the vehicle interior air conditioning unit 40.

The casing 41 is provided with an air passage for the blown air to be blown into the vehicle compartment, and is made of a resin (for example, polypropylene) that has a certain degree of elasticity and is also excellent in terms of strength. An inside and outside air switching device 43 is disposed on a most upstream side of the blown air flow in the casing 41 as an inside and outside air switching unit that switchably introduces the inside air (vehicle interior air) and the outside air (vehicle exterior air) into the casing 41.

The inside and outside air switching device 43 continuously adjusts opening areas of an inside air introduction port for introducing the inside air into the casing 41, and an outside air introduction port for introducing the outside air into the casing 41 by an inside and outside air switching door to continuously change an air volume ratio of an inside air volume and an outside air volume. The inside and outside air switching door is driven by an electric actuator for the inside and outside air switching door, and the electric actuator is controlled in operation according to a control signal output from the control device.

The blower 42 is disposed on the blown air flow downstream side of the inside and outside air switching device 43. The blower 42 functions as a blowing device that blows the air taken through the inside and outside air switching device 43 toward the vehicle compartment. The blower 42 is an electric blower that drives a centrifugal multi-blade fan (sirocco fan) with the help of an electric motor, and is controlled in rotation speed (blown air amount) according to a control voltage output from the control device.

The evaporator 14 and the heater core 44 are disposed on the blown air flow downstream side of the blower 42, in the stated order along a flow of the blown air. In other words, the evaporator 14 is disposed on the blown air flow upstream side than the heater core 44. The heater core 44 is a heating heat exchanger that exchanges heat between an engine coolant and the blown air that has passed through the evaporator 14, and heats the blown air.

Further, a cold air bypass passage 45 is provided in the casing 41. The cold air bypass passage 45 allows the blown air having passed through the evaporator 14 to bypass the heater core 44 and flow to the downstream side. The air mixture door 46 is disposed on the blown air flow downstream side of the evaporator 14 and on the blown air flow upstream side of the heater core 44.

The air mixture door 46 is an air volume ratio adjusting device that adjusts an air volume ratio of an air passing through the heater core 44 and an air passing through the cold air bypass passage 45 in the air that has passed through the evaporator 14. The air mixture door 46 is driven by an electric actuator for driving the air mixture door, and the electric actuator is controlled in operation according to the control signal output from the control device.

A mixing space is provided on the air flow downstream side of the heater core 44 and on the air flow downstream side of the cold air bypass passage 45. The mixing space allows the air that has passed through the heater core 44 and the air that has passed through the cold air bypass passage 45 to be mixed together. Therefore, the air mixture door 46 adjusts an air volume ratio to adjust the temperature of the blown air (air conditioning wind) mixed in the mixing space.

In addition, an opening hole not shown is provided on the most downstream portion of the casing 41 in the blown air flow. The air conditioning wind mixed in the mixing space is blown through the opening hole into the vehicle compartment as an air-conditioning target space. Specifically, a face opening hole, a foot opening hole, and defroster opening hole are provided as the opening holes. The face opening hole is provided for blowing the air conditioning wind toward an upper body of an occupant present in the vehicle compartment, the foot opening hole is provided for blowing the air conditioning wind toward feet of the occupant, and the defroster opening hole is provided for blowing the air conditioning wind toward an inner surface of a windshield of a vehicle.

The blown air flow downstream sides of the face opening hole, the foot opening hole, and the defroster opening hole are connected to a face blowing port, a foot blowing port, and a defroster blowing port (all of them are not shown), which are provided in the vehicle compartment, through ducts that form air passages, respectively.

Further, a face door that adjusts the area of the face opening hole, a foot door that adjusts the opening area of the foot opening hole, and a defroster door that adjusts the area of the defroster opening hole (all of them are not shown) are disposed on the blown air flow upstream sides of the face opening hole, the foot opening hole, and the defroster opening hole, respectively.

The face doors, the foot doors, and the defroster doors each configure an opening hole mode switching device for switching an opening hole mode, are coupled with electric actuators for driving the blowing port mode doors through link mechanisms, and rotationally operated in association with the electric actuators. Meanwhile, the operation of this electric actuator is also controlled by a control signal that is output from the control device.

The control device not shown includes a well-known microcomputer including a CPU, a ROM and a RAM, and peripheral circuits of the microcomputer. The control device controls the operation of the above-mentioned various electric actuators by performing various calculations and processing on the basis of a control program stored in the ROM.

Further, the control device is connected with an air conditioning control sensor set such as an inside air temperature sensor, an outside air temperature sensor, an insulation sensor, an evaporator temperature sensor, a coolant temperature sensor, a discharge pressure sensor. The control device receives detection values from the group of those sensors. The inside air temperature sensor detects a vehicle interior temperature (interior temperature) Tr. The outside air temperature sensor detects an outside air temperature Tam. The insulation sensor detects the amount of insulation As in the vehicle compartment. The evaporator temperature sensor detects the blowing air temperature from the evaporator 14 (the temperature of the evaporator) Tefin. The coolant temperature sensor detects a coolant temperature Tw of an engine coolant flowing into the heater core 44. The discharge pressure sensor detects a pressure Pd of the high-pressure refrigerant discharged from the compressor 11.

Furthermore, an operation panel not shown, which is disposed in the vicinity of an instrument panel positioned at a front part in the vehicle compartment, is connected to the input side of the control device, and operation signals output from various operation switches mounted on the operation panel are input to the control device. An air conditioning operation switch that is used to perform air conditioning in the vehicle compartment, a vehicle interior temperature setting switch that is used to set a vehicle interior setting temperature Tset, and the like are provided as the various operation switches that are mounted on the operation panel.

Meanwhile, the control device of the present embodiment is integrated with a control unit for controlling the operations of various control target devices connected to the output side of the control device, but a configuration of the control device (hardware and software), which controls the operations of the respective control target devices forms the control unit of the respective control target devices. For example, in the present embodiment, a configuration which controls the operation of the discharge capacity control valve of the compressor 11 configures a discharge capacity control unit.

Subsequently, the operation of the present embodiment having the above configuration will be described. In the vehicle air conditioning apparatus according to the present embodiment, when an air conditioning operation switch of the operation panel is turned on (ON), the control device executes an air conditioning control program stored in a storage circuit in advance.

The air conditioning control program reads the detection signals from the above air conditioning control sensor set, and the operation signals of the operation panel. Subsequently, the control device calculates a target blowing temperature TAO that is a target temperature of the air that is blown into the vehicle compartment on the basis of the read detection signals and the read operation signals.

The target blowing temperature TAO is calculated by Formula F1 below.

$$TAO = Kset*Tset - Kr*Tr - Kam*Tam - Ks*As + C \quad (F1)$$

Meanwhile, Tset denotes a vehicle interior setting temperature that is set by the temperature setting switch, Tr denotes an interior temperature that is detected by the inside air temperature sensor, Tam denotes the outside air temperature that is detected by the outside air temperature sensor, and As denotes an amount of insulation that is detected by the insulation sensor. Kset, Kr, Kam, Ks denote control gains, and C denotes a constant for correction.

Further, the air conditioning control program determines operation states of the various control target devices connected to the output side of the control device on the basis of the calculated target blowing temperature TAO and the detection signals of the sensor group.

For example, the refrigerant discharge capacity of the compressor 11, that is, a control current to be output to the discharge capacity control valve of the compressor 11 is determined as described below. First, a target evaporator blowing temperature TEO of the blown air blown from the evaporator 14 is determined on the basis of the target blowing temperature TAO with reference to a control map that is stored in a storage circuit in advance.

Then, the control current to be output to the discharge capacity control valve of the compressor 11 is determined through a feedback control technique on the basis of a deviation between the evaporator temperature Tefin detected by the evaporator temperature sensor and the target evaporator blowing temperature TEO so that the evaporator temperature Tefin comes closer to the target evaporator blowing temperature TEO.

The rotation speed of the blower 42, that is, a control voltage to be output to the blower 42 is determined on the basis of the target blowing temperature TAO with reference to the control map stored in the storage circuit in advance. More specifically, the blown air amount is controlled to come close to a maximum amount with the control voltage to be output to the electric motor as a maximum in a cryogenic range of the target blowing temperature TAO (maximum cooling range) and an extremely high temperature range (maximum heating range), and the blown air amount is reduced more as the target blowing temperature TAO comes closer to an intermediate temperature range.

Also, an opening degree of the air mixture door 46, that is, a control signal to be output to the electric actuator for driving the air mixture door is determined so that the temperature of the blown air blown into the vehicle compartment comes closer to the target blowing temperature TAO on the basis of the evaporator temperature Tefin and the coolant temperature Tw.

Then, the control device outputs the control signal and so on determined as described above to the various control target devices. Thereafter, a control routine of reading the detection signals and the operation signals described above, calculating the target blowing temperature TAO, determining the operation states of the various control target devices, and outputting the control signal, and so on is repeated in the stated order for each predetermined control cycle until the actuation stop of the vehicle air conditioning apparatus is requested.

With the above operation, in the ejector-type refrigeration cycle 10, the refrigerant flows as indicated by thick solid arrows in FIG. 1.

In other words, a high-temperature high-pressure refrigerant discharged from the compressor 11 flows into the condensing portion 12a of the radiator 12. The refrigerant that has flowed into the condensing portion 12a performs the heat exchange with the outside air blown from the cooling fan 12d, radiates the heat, and is condensed. The refrigerant condensed by the condensing portion 12a is separated into gas and liquid by the receiver portion 12b. A liquid-phase refrigerant, which has been subjected to gas-liquid separation in the receiver portion 12b, performs heat exchange with the outside air blown from the cooling fan 12d by the subcooling portion 12c, and radiates heat into a subcooled liquid-phase refrigerant.

The subcooled liquid-phase refrigerant that has flowed out of the subcooling portion 12c of the radiator 12 is isentropically depressurized by the nozzle passage 13a, and ejected. The nozzle passage 13a is defined between an inner peripheral surface of the depressurizing space 30b of the ejector module 13 and an outer peripheral surface of the passage formation member 35. In this situation, a refrigerant passage area of the depressurizing space 30b in the minimum passage area portion 30m is regulated so that the degree of superheating of the refrigerant on the outlet side of the evaporator 14 comes closer to a reference superheating degree.

The refrigerant that has flowed out of the evaporator 14 is drawn into the ejector module 13 from the refrigerant suction port 31b due to the suction action of the ejection refrigerant which has been ejected from the nozzle passage 13a. The ejection refrigerant ejected from the nozzle passage 13a and the drawn refrigerant drawn through the suction passage 13b flow into the diffuser passage 13c and join together.

In the diffuser passage 13c, a kinetic energy of the refrigerant is converted into a pressure energy due to an increase in a refrigerant passage area. As a result, a pressure of the mixed refrigerant is increased while the ejection refrigerant and the drawn refrigerant are mixed together. The refrigerant that has flowed out of the diffuser passage 13c is separated into gas and liquid in the gas-liquid separation space 30f. The liquid-phase refrigerant separated in the gas-liquid separation space 30f is reduced in pressure in the orifice 31i, and flows into the evaporator 14.

The refrigerant that has flowed into the evaporator 14 absorbs heat from the blown air blown by the blower 42, and evaporates. Accordingly, the blown air is cooled. On the other hand, the gas-phase refrigerant that has been separated in the gas-liquid separation space 30f flows out of the gas-phase refrigerant outflow port 31d, is drawn into the compressor 11, and again compressed.

The blown air cooled by the evaporator 14 flows into an air flow passage on the heater core 44 side and the cold air bypass passage 45 according to the opening degree of the air mixture door 46. The cold air that has flowed into the air flow passage on the heater core 44 side is again heated when passing through the heater core 44, and is mixed with the cold air that has passed through the cold air bypass passage 45 in the mixing space. Subsequently, the air conditioning wind adjusted in temperature in the mixing space is blown from the mixing space into the vehicle compartment via the respective blowing ports.

As described above, according to the vehicle air conditioning apparatus of the present embodiment, the air conditioning in the vehicle compartment can be performed. In addition, according to the ejector-type refrigeration cycle 10 of the present embodiment, since the refrigerant that has been increased in pressure by the diffuser passage 13c is drawn into the compressor 11, the driving power of the compressor 11 is reduced more, thereby being capable of improving the cycle efficiency (COP) than that in the normal refrigeration cycle device.

Incidentally, the normal refrigeration cycle device is configured by connecting the compressor, the radiator, the depressurizing device (expansion valve), and the evaporator in a ring shape. Therefore, in the normal refrigeration cycle device, the pressure of the drawn refrigerant to be drawn into the compressor is substantially equal to the refrigerant evaporation pressure in the evaporator.

Incidentally, in the ejector module 13 according to the present embodiment, since the gas-liquid separation space 30f is provided in the body portion 30, when the ejector module 13 per se and the inlet pipe 15d that connects the liquid-phase refrigerant outflow port 31c of the ejector module 13 and the refrigerant inflow port of the evaporator 14 are disposed in a high-temperature environment such as the engine room, the liquid-phase refrigerant separated by the gas-liquid separation space 30f is likely to absorb the heat in the engine room.

Then, the liquid-phase refrigerant separated by the gas-liquid separation space 30f absorbs the heat within the engine room, and when an enthalpy of the refrigerant to flow into the evaporator 14 is caused to rise, a refrigeration performance delivered in the evaporator 14 may be lowered.

Further, in the ejector-type refrigeration cycle 10, a temperature of the refrigerant that flows into the evaporator 14 through the inlet pipe 15d becomes lower than that in the normal refrigeration cycle device. For that reason, a temperature difference between the refrigerant that flows into the inlet pipe 15d and the temperature of the engine room is likely to be larger than that in the normal refrigeration cycle device, and the enthalpy of the refrigerant that flows into the evaporator 14 is likely to increase.

On the contrary, in the ejector-type refrigeration cycle 10 according to the present embodiment, since the ejector module 13 is disposed closer to the evaporator 14 than the compressor 11, and the length of the inlet pipe 15d is shorter than the length of the suction pipe 15c, the liquid-phase refrigerant separated by the gas-liquid separation space 30f can be restrained from absorbing the heat in the engine room when flowing in the inlet pipe 15d.

Figure 2:
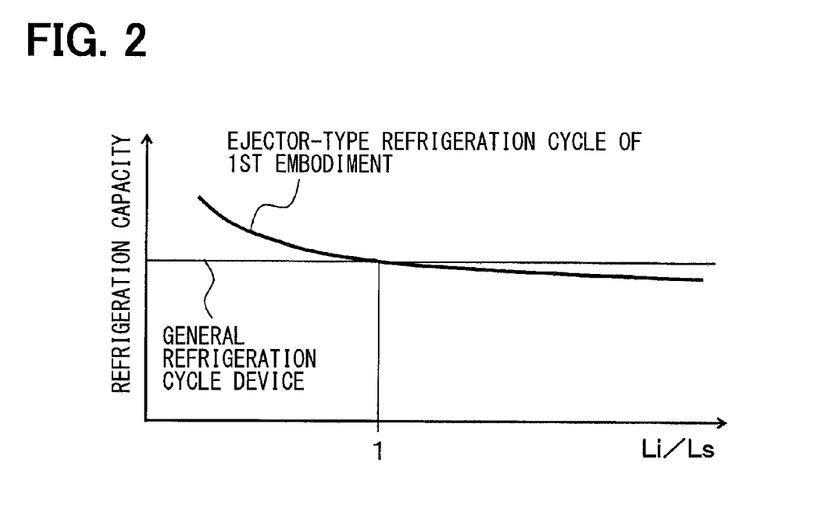
FIG. 2 is a diagram illustrating a relationship between a pipe length ratio (Li/Ls) and a refrigeration capacity in the ejector-type refrigeration cycle according to the first embodiment.

In more detail, according to the present inventors' study, when a length of the suction pipe 15c is defined as Ls, a length of the inlet pipe 15d is defined as Li, and a pipe length ratio is defined as Li/Ls, it is confirmed that a relationship between the pipe length ratio Li/Ls and the refrigeration capacity under a predetermined general operating condition is changed as indicated by a graph of FIG. 2.

In other words, it is confirmed that, in a range (that is, a range of Li<2 m) of the length of the inlet pipe for the normal refrigeration cycle device used in the general vehicle air conditioning apparatus, the refrigeration performance delivered in the evaporator 14 can be improved more than that of the normal refrigeration cycle device when Li/Ls<1 is satisfied.

Therefore, in the ejector-type refrigeration cycle 10, the refrigeration performance delivered in the evaporator 14 can be improved more than that in the normal refrigeration cycle device when the length Li of the inlet pipe 15d is shorter than the length Ls of the suction pipe 15c in a range where the length Li of the inlet pipe 15d is equal to or shorter than 2 m. As a result, according to the ejector-type refrigeration cycle 10 of the present embodiment, a reduction in the refrigeration performance delivered in the evaporator 14 can be suppressed.

(Second Embodiment)

Figure 3:
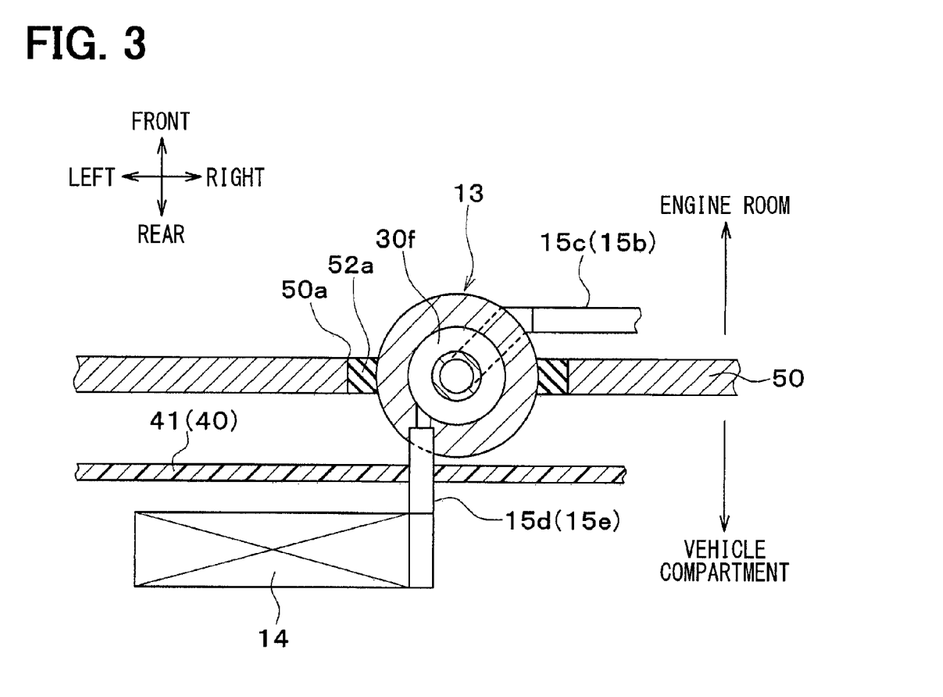
FIG. 3 is a schematic diagram illustrating an arrangement of an ejector module according to a second embodiment of the present disclosure.

In the present embodiment, an example in which an arrangement of an ejector module 13 is changed from that in the first embodiment will be described. As illustrated in FIG.

3, the ejector module 13 according to the present embodiment is disposed on an inner peripheral side of a through hole 50a of a fire wall 50.

In more detail, one part of the ejector module 13 according to the present embodiment is disposed in an engine room (vehicle exterior space) side, and another part of the ejector module 13 is disposed in a vehicle compartment (vehicle interior space) side. For that reason, the ejector module 13 according to the present embodiment is disposed closer to the fire wall 50 than the compressor 11. Further, an inlet pipe 15d and an outlet pipe 15e according to the present embodiment are disposed on the vehicle compartment (vehicle interior space) side.

FIG. 3 schematically illustrates a positional relationship of the ejector module 13, the fire wall 50, an evaporator 14, and so on. In addition, FIG. 3 illustrates the ejector module 13 in a reduced cross-sectional view taken along a cross-section III-III in FIG. 1. The same is applied to the following drawings.

A packing 52a that performs the same function as that in the first embodiment is disposed in a gap between an outer peripheral side of the ejector module 13 and an opening edge of the through hole 50a. Therefore, in the present embodiment, a connector 51 is eliminated. Further, in the present embodiment, it can be expressed that the ejector module 13 is fixed to the fire wall 50 indirectly and swingably through a packing 52a.

It is needless to say that the ejector module 13 may be fixed directly to the fire wall 50 by a method such as bolt tightening, or may be fixed indirectly to the fire wall 50 by a bracket or the like.

Further, in the present embodiment, as illustrated in FIG. 3, a portion of the suction pipe 15c connected to the ejector module 13 (module connection portion) and a module connection portion of the downstream side high-pressure pipe 15b are disposed to overlap with each other when viewed in a vertical direction. The module connection portion of the suction pipe 15c and the module connection portion of the downstream side high-pressure pipe 15b are each shaped to extend along the fire wall 50. For example, the module side connection portion represents a portion connected directly to the ejector module 13.

In this example, the "shape to extend along the fire wall 50" is not limited to a shape extending perfectly in parallel to the fire wall 50, but includes a shape slightly deviated from the shape extending in parallel due to a manufacturing error or an assembling error. In addition, in the present embodiment, the module connection portion of the outlet pipe 15e and the module connection portion of the inlet pipe 15d are disposed to overlap with each other when viewed from the vertical direction.

The other configurations of the ejector-type refrigeration cycle 10 are identical with those in the first embodiment. Therefore, when the vehicle air conditioning apparatus according to the present embodiment is actuated, the air conditioning in the vehicle compartment can be realized as in the first embodiment.

Further, according to the ejector-type refrigeration cycle 10 of the present embodiment, since a part of the ejector module 13 is disposed in the vehicle compartment, the liquid-phase refrigerant separated by the gas-liquid separation space 30f in the ejector module 13 can be restrained from absorbing the heat in the engine room. In addition, since the inlet pipe 15d is disposed in the vehicle compartment, the liquid-phase refrigerant that flows in the inlet pipe 15d hardly absorbs the heat in the engine room. Therefore, a reduction in the refrigeration performance delivered in the evaporator 14 can be effectively suppressed.

In addition, according to the ejector-type refrigeration cycle 10 of the present embodiment, the module connection portion of the suction pipe 15c and the module connection portion of the downstream side high-pressure pipe 15b are shaped to extend along the fire wall 50. Therefore, a dimension (the amount of protrusion) by which the suction pipe 15c and the downstream side high-pressure pipe 15b protrude from the fire wall 50 toward the engine room side can be reduced.

According to the above configuration, in placing an equipment such as the engine in the engine room, the suction pipe 15c and the downstream side high-pressure pipe 15b can be restrained from interfering with each other, and the space in the engine room can be effectively leveraged.

Figure 4:
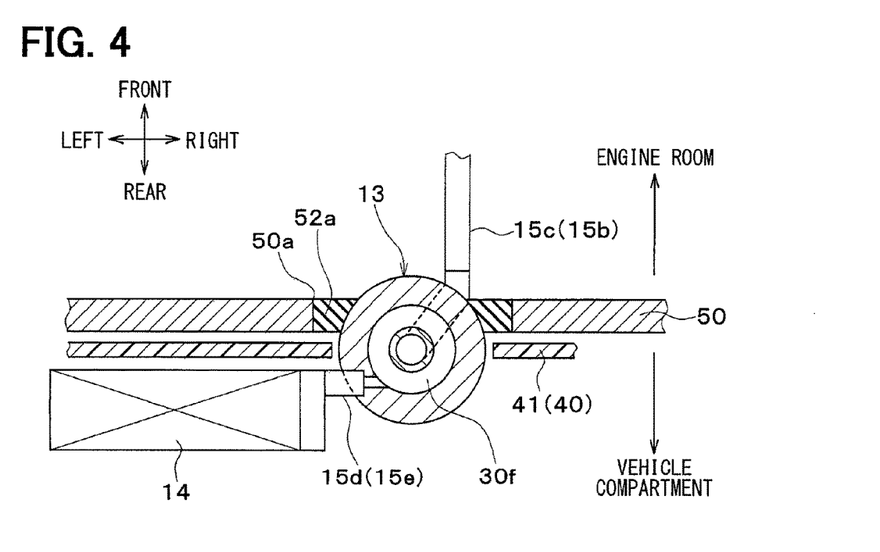
FIG. 4 is a schematic diagram illustrating a modification of the arrangement of the ejector module according to the second embodiment.

Incidentally, against the present embodiment, as illustrated in FIG. 4, the module connection portion of the outlet pipe 15e and the module connection portion of the inlet pipe 15d may be shaped to extend along the fire wall 50. According to that configuration, the space in the vehicle compartment can be effectively leveraged.

Further, the module connection portion of the suction pipe 15c and the module connection portion of the downstream side high-pressure pipe 15b may be shaped to extend along the fire wall 50, and the module connection portion of the outlet pipe 15e and the module connection portion of the inlet pipe 15d may be shaped to extend along the fire wall 50.

(Third Embodiment)

Figure 5:
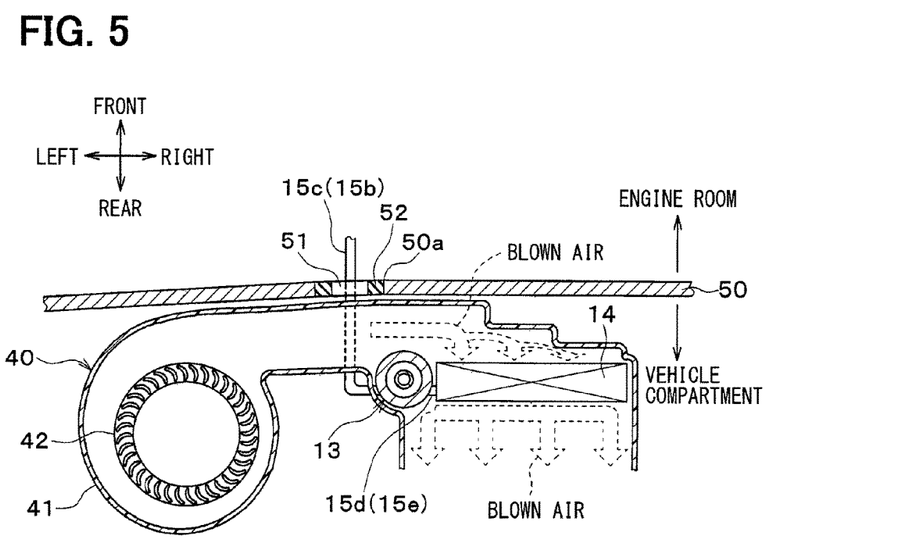
FIG. 5 is a schematic diagram illustrating an arrangement of an ejector module according to a third embodiment of the present disclosure.

In the present embodiment, an example in which an arrangement of an ejector module 13 is changed from that in the first embodiment will be described. As illustrated in FIG. 5, the ejector module 13 according to the present embodiment is disposed in the casing 41 of the vehicle interior air conditioning unit 40 which is placed in the vehicle compartment. In more detail, the ejector module 13 according to the present embodiment is disposed in an air passage provided in the casing 41 and on a side of the evaporator 14.

FIG. 5 illustrates a schematic cross-sectional top view of the vehicle interior air conditioning unit 40, which shows an arrangement of the ejector module 13 in the casing 41 according to the present embodiment. The same is applied to FIGS. 6 and 7 which will be described later.

As illustrated in FIG. 5, the air passage provided in the casing 41 according to the present embodiment is shaped so that the blown air flows in a direction (vehicle width direction) parallel to a heat exchange core surface of the evaporator 14 on an upstream side of the evaporator 14 when viewed from the vertical direction. Also, the air passage is shaped so that the blown air flows in a direction (vehicle anteroposterior direction) perpendicular to the heat exchange core surface of the evaporator 14 on the downstream side of the evaporator 14.

For that reason, as in the present embodiment, when the ejector module 13 is disposed on the side of the evaporator 14, a wall surface of the air passage in which the blown air on the upstream side of the evaporator 14 flows can be configured by one part of a cylindrical side surface of the body portion 30 of the ejector module 13. Further, a wall surface of the air passage in which the blown air on the downstream side of the evaporator 14 flows can be configured by another part of the cylindrical side surface of the body portion 30.

In other words, at least one part of the ejector module 13 according to the present embodiment is disposed so as to be cooled by the blown air flowing into the evaporator 14, and at least another part of the ejector module 13 is disposed so as to be cooled by the blown air cooled by the evaporator 14.

The other configurations of the ejector-type refrigeration cycle 10 are identical with those in the first embodiment. Therefore, when the vehicle air conditioning apparatus according to the present embodiment is actuated, the air conditioning in the vehicle compartment can be realized as in the first embodiment. Also, according to the ejector-type refrigeration cycle 10 of the present embodiment, since the ejector module 13 is disposed in the casing 41, a reduction in the refrigeration performance delivered in the evaporator 14 can be suppressed as in the second embodiment.

Further, in the present embodiment, since the ejector module 13 can be cooled by the blown air flowing into the evaporator 14 and the blown air cooled by the evaporator 14, the enthalpy of the refrigerant flowing into the evaporator 14 is hardly increased. As a result, a reduction in the refrigeration performance delivered in the evaporator 14 can be extremely effectively suppressed.

Figure 6:
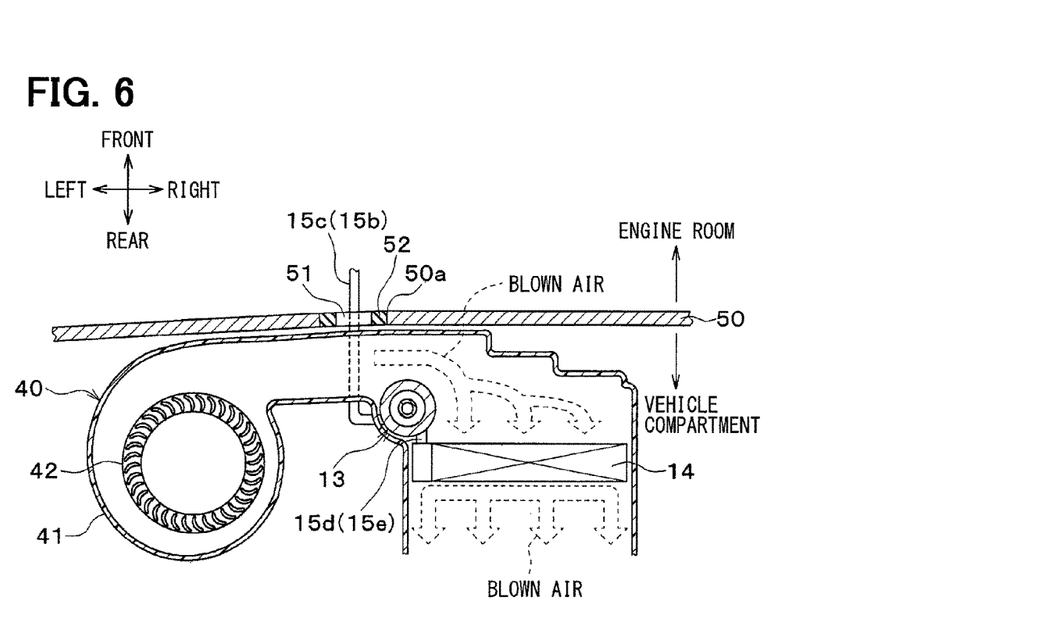
FIG. 6 is a schematic diagram illustrating one modification of the arrangement of the ejector module according to the third embodiment.
Figure 7:
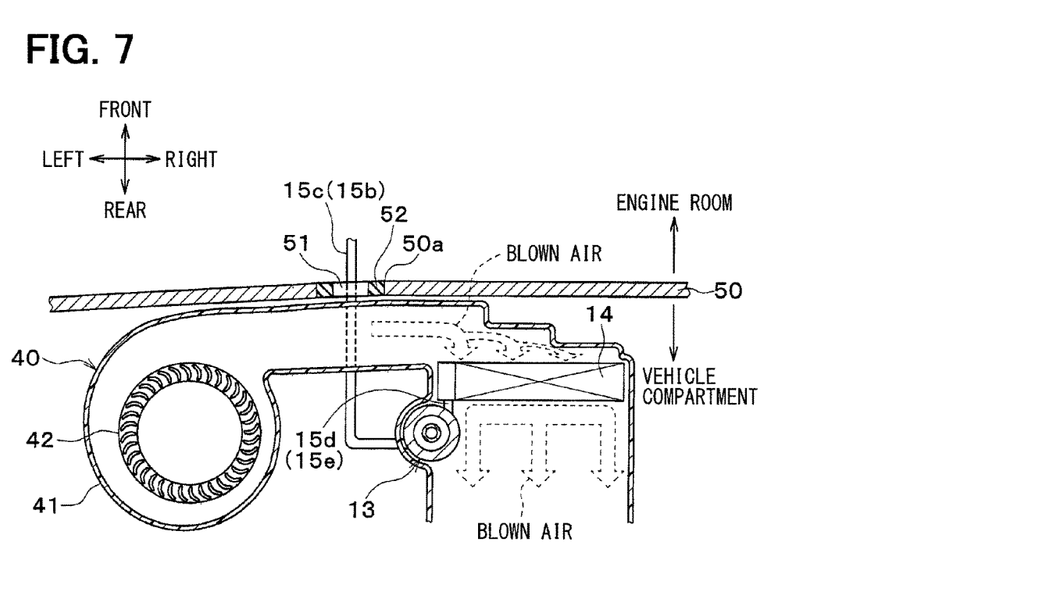
FIG. 7 is a schematic diagram illustrating another modification of the arrangement of the ejector module according to the third embodiment.

Incidentally, against the present embodiment, as illustrated in FIG. 6, the ejector module 13 may be disposed in the air passage on the upstream side of the evaporator 14, and the ejector module 13 may be disposed so as to be cooled by the blown air flowing into the evaporator 14. In addition, as illustrated in FIG. 7, the ejector module 13 may be disposed in the air passage on the downstream side of the evaporator 14, and the ejector module 13 may be disposed so as to be cooled by the blown air cooled by the evaporator 14.

The present invention is not limited to the above-described embodiments, but various modifications can be made thereto as follows without departing from the spirit of the present invention.

In the embodiments described above, the example in which the ejector-type refrigeration cycle 10 is applied to the vehicle air conditioning apparatus, and the ejector module 13 is disposed closer to the evaporator 14 and the fire wall 50 than the compressor 11 has been described. On the contrary, more preferably, the ejector module 13 may be disposed closer to the evaporator 14 and the fire wall 50 than the engine. More preferably, it is desirable that the ejector module 13 is disposed in a portion unlikely to be thermally affected by the engine.

In the embodiments described above, the example in which the length of the inlet pipe 15*d* is set to be shorter than the length of the suction pipe 15*c* has been described. On the contrary, in the ejector-type refrigeration cycle 10 applied to the vehicle, a length of a pipe extending from the liquid-phase refrigerant outflow port 31*c* of the ejector module 13 to the connector 51 of the fire wall 50 in the inlet pipe 15*d* may be shorter than the length of the suction pipe 15*c*. With the above configuration, the liquid-phase refrigerant that flows in the inlet pipe 15*d* can be restrained from absorbing the heat in the engine room.

The respective configuration equipments configuring the ejector-type refrigeration cycle 10 are not limited to the equipments disclosed in the above embodiments.

For example, in the above embodiments, the example in which the variable capacity type compressor is employed as the compressor 11 has been described. However, the compressor 11 is not limited to the above configuration. For example, as the compressor 11, a fixed capacity type compressor which is driven by a rotational drive force output from the engine through an electromagnetic clutch, a belt, and so on may be employed. In a fixed capacity type compressor, an operation rate of the compressor may be changed by intermittent operation of the electromagnetic clutch to adjust the refrigerant discharge capacity. Also, as the compressor 11, an electric compressor that adjusts the refrigerant discharge capacity while changing the rotational speed of an electric motor may be employed.

In addition, in the above-described embodiments, examples in which a subcooling heat exchanger is employed as the radiator 12 have been described, but, it is needless to say that a normal radiator formed of only the condensing portion 12*a* may be employed as the radiator 12. Further, with a normal radiator, a liquid receiver (receiver) that separates the refrigerant radiated by the radiator into gas and liquid, and stores an excess liquid-phase refrigerant may be employed.

In addition, in the embodiments described above, the example in which the body portion 30 of the ejector module 13 is formed into the cylindrical shape has been described, but the body portion 30 may be formed into a prismatic shape. The components of the body portion 30, the passage formation member 35, and so on of the ejector module 13 are not limited to metal, but may be made of resin.

In the above embodiments, the example in which the ejector-type refrigeration cycle 10 of the present disclosure is applied to the vehicle air conditioning apparatus has been described, but the application of the ejector-type refrigeration cycle 10 of the present disclosure is not limited to the above configuration. For example, the ejector-type refrigeration cycle may be applied to a vehicle refrigeration apparatus, a stationary air conditioning apparatus, a cold storage warehouse or the like.

The present disclosure has been described based on the embodiments; however, it is understood that this disclosure is not limited to the embodiments or the structures. The present disclosure includes various modification examples, or modifications within an equivalent range. In addition, various combinations or forms, and other combinations or forms including only one element, more than or less than one among these combinations or forms are included in the scope or the technical scope of the present disclosure.

The invention claimed is:

1. An ejector-type refrigeration cycle comprising;
   a compressor that compresses and discharges a refrigerant;
   a radiator that radiates heat of the refrigerant discharged from the compressor;
   an ejector module including a body portion that includes
     a nozzle portion which reduces a pressure of the refrigerant which has flowed out of the radiator,
     a refrigerant suction port which draws the refrigerant from an evaporator by a suction action the refrigerant ejected at high speed from the nozzle portion,
     a pressure increase portion which mixes the ejected refrigerant with the drawn refrigerant drawn from the refrigerant suction port and increases a pressure of the mixed refrigerant of the ejected refrigerant and the drawn refrigerant,
     a gas-liquid separation portion which separates the mixed refrigerant that has flowed out of the pressure increase portion into gas and liquid phases,
     a liquid-phase refrigerant outflow port through which the liquid-phase refrigerant separated by the gas-liquid separation portion flows out, and
     a gas-phase refrigerant outflow port through which the gas-phase refrigerant separated by the gas-liquid separation portion flows out;
   the evaporator is separated from the ejector module and evaporates the liquid-phase refrigerant separated by the gas-liquid separation portion;

an inlet pipe that connects the liquid-phase refrigerant outflow port to a refrigerant inflow port of the evaporator; and a suction pipe that connects the gas-phase refrigerant outflow port to a suction port of the compressor, wherein a length of the inlet pipe is shorter than a length of the suction pipe, a vehicle interior space in which the evaporator is disposed and a vehicle exterior space in which the radiator is disposed are partitioned by a partition plate, a part of the ejector module is disposed in the vehicle interior space, and another part of the ejector module is disposed in the vehicle exterior space.

2. The ejector-type refrigeration cycle according to claim 1, wherein the ejector module is disposed closer to the partition plate than to the compressor.

3. The ejector-type refrigeration cycle according to claim 2, wherein at least one of the inlet pipe and the suction pipe includes a portion that is connected to the ejector module and is shaped to extend along the partition plate.

4. The ejector-type refrigeration cycle according to claim 1, the ejector-type refrigeration cycle being applied to a vehicle air conditioning apparatus, wherein a length of the inlet pipe is equal to less than 2 meters.

5. The ejector-type refrigeration cycle according to claim 1, wherein the ejector module is fixed to the partition plate.

6. The ejector-type refrigeration cycle according to claim 5, wherein the ejector module is swingably fixed to the partition plate.

7. The ejector-type refrigeration cycle according to claim 1, wherein the inlet pipe is connected to the part of the ejector module disposed in the vehicle interior space.

8. An ejector-type refrigeration cycle comprising:
a compressor that compresses and discharges a refrigerant;
a radiator that radiates heat of the refrigerant discharged from the compressor;
an ejector module including a body portion that includes
a nozzle portion which reduces a pressure of the refrigerant which has flowed out of the radiator,
a refrigerant suction port which draws the refrigerant from an evaporator by a suction action of the refrigerant ejected at high speed from the nozzle portion,
a pressure increase portion which mixes the ejected refrigerant with the drawn refrigerant drawn from the refrigerant suction port and increases a pressure of the mixed refrigerant of the ejected refrigerant and the drawn refrigerant,
a gas-liquid separation portion which separates the mixed refrigerant that has flowed out of the pressure increase portion into gas and liquid phases,
a liquid-phase refrigerant outflow port through which the liquid-phase refrigerant separated by the gas-liquid separation portion flows out, and
a gas-phase refrigerant outflow port through which the gas-phase refrigerant separated by the gas-liquid separation portion flows out; and
the evaporator is separated from the ejector module and evaporates the liquid-phase refrigerant separated by the gas-liquid separation portion, wherein
the ejector module is disposed closer to the evaporator than to the compressor, a vehicle interior space in which the evaporator is disposed and a vehicle exterior space in which the radiator is disposed are partitioned by a partition plate, a part of the ejector module is disposed in the vehicle interior space, and another part of the ejector module is disposed in the vehicle exterior space.

9. The ejector-type refrigeration cycle according to claim 8, wherein the ejector module is disposed closer to the partition plate than to the compressor.

10. The ejector-type refrigeration cycle according to claim 9, further comprising:

an inlet pipe that connects the liquid-phase refrigerant outflow port to a refrigerant inflow port of the evaporator; and a suction pipe that extends from the gas-phase refrigerant outflow port to a suction port of the compressor, wherein at least one of the inlet pipe and the suction pipe includes a portion that is connected to the ejector module and is shaped to extend along the partition plate.

11. The ejector-type refrigeration cycle according to claim 10, the ejector-type refrigeration cycle being applied to a vehicle air conditioning apparatus, wherein a length of the inlet pipe is equal to less than 2 meters.

12. An ejector-type refrigeration cycle comprising:
a compressor that compresses and discharges a refrigerant;
a radiator that radiates heat of the refrigerant discharged from the compressor;
an ejector module including a body portion that includes
a nozzle portion which reduces a pressure of the refrigerant which has flowed out of the radiator,
a refrigerant suction port which draws the refrigerant from an evaporator by a suction action of the refrigerant ejected at high speed from the nozzle portion,
a pressure increase portion which mixes the ejected refrigerant with the drawn refrigerant drawn from the refrigerant suction port and increases a pressure of the mixed refrigerant of the ejected refrigerant and the drawn refrigerant,
a gas-liquid separation portion which separates the mixed refrigerant that has flowed out of the pressure increase portion into gas and liquid phases,
a liquid-phase refrigerant outflow port through which the liquid-phase refrigerant separated by the gas-liquid separation portion flows out, and
a gas-phase refrigerant outflow port through which the gas-phase refrigerant separated by the gas-liquid separation portion flows out;
the evaporator is separated from the ejector module and evaporates the liquid-phase refrigerant separated by the gas-liquid separation portion;
an inlet pipe that connects the liquid-phase refrigerant outflow port to a refrigerant inflow port of the evaporator; and
a suction pipe that connects the gas-phase refrigerant outflow port to a suction port of the compressor, wherein
a length of the inlet pipe is shorter than a length of the suction pipe,
a vehicle interior space in which the evaporator is disposed and a vehicle exterior space in which the radiator is disposed are partitioned by a partition plate,
the ejector module is disposed closer to the partition plate than to the compressor, at least a part of the ejector module is disposed in the vehicle interior space, and at least a part of the ejector module is disposed to be cooled by a blown air that flows into the evaporator.

13. An The ejector-type refrigeration cycle comprising:
a compressor that compresses and discharges a refrigerant;
a radiator that radiates heat of the refrigerant discharged from the compressor;
an ejector module including a body portion that includes
  a nozzle portion which reduces a pressure of the refrigerant which has flowed out of the radiator,
  a refrigerant suction port which draws the refrigerant from an evaporator by a suction action of the refrigerant ejected at high speed from the nozzle portion,
  a pressure increase portion which mixes the ejected refrigerant with the drawn refrigerant drawn from the refrigerant suction port and increases a pressure of the mixed refrigerant of the ejected refrigerant and the drawn refrigerant,
  a gas-liquid separation portion which separates the mixed refrigerant that has flowed out of the pressure increase portion into gas and liquid phases,
  a liquid-phase refrigerant outflow port through which the liquid-phase refrigerant separated by the gas-liquid separation portion flows out, and
  a gas-phase refrigerant outflow port through which the gas-phase refrigerant separated by the gas-liquid separation portion flows out;
the evaporator is separated from the ejector module and evaporates the liquid-phase refrigerant separated by the gas-liquid separation portion;
an inlet pipe that connects the liquid-phase refrigerant outflow port to a refrigerant inflow port of the evaporator; and
a suction pipe that connects the gas-phase refrigerant outflow port to a suction port of the compressor, wherein
a length of the inlet pipe is shorter than a length of the suction pipe,
a vehicle interior space in which the evaporator is disposed and a vehicle exterior space in which the radiator is disposed are partitioned by a partition plate,
the ejector module is disposed closer to the partition plate than to the compressor,
at least a part of the ejector module is disposed in the vehicle interior space, and
at least a part of the ejector module is disposed to be cooled by a blown air that has been cooled by the evaporator.

14. An ejector-type refrigeration cycle comprising:
a compressor that compresses and discharges a refrigerant;
a radiator that radiates heat of the refrigerant discharged from the compressor;
an ejector module including a body portion that includes
  a nozzle portion which reduces a pressure of the refrigerant which has flowed out of the radiator,
  a refrigerant suction port which draws the refrigerant from an evaporator by a suction action of the refrigerant ejected at high speed from the nozzle portion,
  a pressure increase portion which mixes the ejected refrigerant with the drawn refrigerant drawn from the refrigerant suction port and increases a pressure of the mixed refrigerant of the ejected refrigerant and the drawn refrigerant,
  a gas-liquid separation portion which separates the mixed refrigerant that has flowed out of the pressure increase portion into gas and liquid phases,
  a liquid-phase refrigerant outflow port through which the liquid-phase refrigerant separated by the gas-liquid separation portion flows out, and
  a gas-phase refrigerant outflow port through which the gas-phase refrigerant separated by the gas-liquid separation portion flows out; and
the evaporator is separated from the ejector module and evaporates the liquid-phase refrigerant separated by the gas-liquid separation portion, wherein
the ejector module is disposed closer to the evaporator than to the compressor,
a vehicle interior space in which the evaporator is disposed and a vehicle exterior space in which the radiator is disposed are partitioned by a partition plate,
the ejector module is disposed closer to the partition plate than to the compressor,
at least a part of the ejector module is disposed in the vehicle interior space, and
at least a part of the ejector module is disposed to be cooled by a blown air that flows into the evaporator.

15. An ejector-type refrigeration cycle comprising:
a compressor that compresses and discharges a refrigerant;
a radiator that radiates heat of the refrigerant discharged from the compressor;
an ejector module including a body portion that includes
  a nozzle portion which reduces a pressure of the refrigerant which has flowed out of the radiator,
  a refrigerant suction port which draws the refrigerant from an evaporator by a suction action of the refrigerant ejected at high speed from the nozzle portion,
  a pressure increase portion which mixes the ejected refrigerant with the drawn refrigerant drawn from the refrigerant suction port and increases a pressure of the mixed refrigerant of the ejected refrigerant and the drawn refrigerant,
  a gas-liquid separation portion which separates the mixed refrigerant that has flowed out of the pressure increase portion into gas and liquid phases,
  a liquid-phase refrigerant outflow port through which the liquid-phase refrigerant separated by the gas-liquid separation portion flows out, and
  a gas-phase refrigerant outflow port through which the gas-phase refrigerant separated by the gas-liquid separation portion flows out; and
the evaporator is separated from the ejector module and evaporates the liquid-phase refrigerant separated by the gas-liquid separation portion, wherein
the ejector module is disposed closer to the evaporator than to the compressor,
a vehicle interior space in which the evaporator is disposed and a vehicle exterior space in which the radiator is disposed are partitioned by a partition plate,
the ejector module is disposed closer to the partition plate than to the compressor,
at least a part of the ejector module is disposed in the vehicle interior space, and
at least a part of the ejector module is disposed to be cooled by a blown air that has been cooled by the evaporator.

* * * * *